(12) United States Patent
Ironmonger et al.

(10) Patent No.: US 11,013,986 B2
(45) Date of Patent: May 25, 2021

(54) INPUT APPARATUS FOR A GAMES CONSOLE

(71) Applicant: Ironburg Inventions Limited, Wincanton (GB)

(72) Inventors: Duncan Ironmonger, Suwanee, GA (US); Carl S. Jeffrey, Cheltenham (GB)

(73) Assignee: Ironburg Inventions Limited, Wincanton (GB)

( * ) Notice: Subject to any disclaimer, the term of this patent is extended or adjusted under 35 U.S.C. 154(b) by 0 days.

(21) Appl. No.: 16/489,446

(22) PCT Filed: Mar. 9, 2018

(86) PCT No.: PCT/GB2018/050604
§ 371 (c)(1),
(2) Date: Aug. 28, 2019

(87) PCT Pub. No.: WO2018/167464
PCT Pub. Date: Sep. 20, 2018

(65) Prior Publication Data
US 2020/0016485 A1 Jan. 16, 2020

Related U.S. Application Data

(60) Provisional application No. 62/471,591, filed on Mar. 15, 2017.

(51) Int. Cl.
*A63F 13/24* (2014.01)
*A63F 13/98* (2014.01)

(52) U.S. Cl.
CPC .............. *A63F 13/24* (2014.09); *A63F 13/98* (2014.09); *A63F 2300/1043* (2013.01)

(58) Field of Classification Search
CPC ... A63F 13/24; A63F 13/98; A63F 2300/1043
See application file for complete search history.

(56) References Cited

U.S. PATENT DOCUMENTS

| 4,032,728 A | 6/1977 | Oelsch |
| 4,786,768 A | 11/1988 | Langewis et al. |

(Continued)

FOREIGN PATENT DOCUMENTS

| CN | 202 528 096 U | 11/2012 |
| CN | 203 077 157 U | 7/2013 |

(Continued)

OTHER PUBLICATIONS

International Searching Authority: International Search Report and Written Opinion, App. No. PCT/GB2018/050604 (dated May 23, 2018).

(Continued)

*Primary Examiner* — Omkar A Deodhar
*Assistant Examiner* — Shauna-Kay Hall
(74) *Attorney, Agent, or Firm* — Walters & Wasylyna LLC

(57) ABSTRACT

The invention provides an improved controller (10) for a games console. The invention is a games controller (10) that is intended to be held by a user in both hands in the same manner as a conventional controller (1). Additionally, the controller of the invention (10) may comprise the same controls (2, 3, 4, 5, 6, 7, 8, 9) as a conventional controller (1). The controller of the present invention (10) is advantageous as it additionally comprises four additional controls (11 A, 11 B, 11 C, 11 D) located on the rear of the controller (10) in a position to be operated by the middle fingers of a user (12). The additional controllers (11 A, 11 B, 11 C, 11 D) may be paddle levers comprising an attachment mechanism which does not require any tools for the attachment of the (Continued)

paddle levers to the controller (10) or the removal of the paddle levers from the controller (10).

19 Claims, 14 Drawing Sheets

(56) References Cited

U.S. PATENT DOCUMENTS

| | | | |
|---|---|---|---|
| 5,430,262 | A | 7/1995 | Matsui et al. |
| 5,451,053 | A | 9/1995 | Garrido |
| 5,773,769 | A | 6/1998 | Raymond |
| 5,841,372 | A | 11/1998 | Matsumoto |
| 5,874,906 | A | 2/1999 | Willner et al. |
| 5,883,690 | A | 3/1999 | Meyers et al. |
| 5,989,123 | A | 11/1999 | Tosaki et al. |
| 6,203,432 | B1 | 3/2001 | Roberts et al. |
| 6,251,015 | B1 | 6/2001 | Caprai |
| 6,512,511 | B2 | 1/2003 | Willner et al. |
| 6,710,766 | B1 | 3/2004 | Ogata |
| 6,752,719 | B2 | 6/2004 | Himoto et al. |
| 6,760,013 | B2 | 7/2004 | Willner et al. |
| 6,853,308 | B1 | 2/2005 | Dustin |
| 7,510,477 | B2 | 3/2009 | Argentar |
| 7,758,424 | B2 | 7/2010 | Riggs et al. |
| 7,859,514 | B1 | 12/2010 | Park |
| 7,993,203 | B1 | 8/2011 | Walker, II et al. |
| 8,641,525 | B2 | 2/2014 | Burgess et al. |
| 8,777,620 | B1 | 7/2014 | Baxter |
| 9,089,770 | B2 | 7/2015 | Burgess et al. |
| 9,804,691 | B1 | 10/2017 | Strahle et al. |
| 2001/0003713 | A1 | 6/2001 | Willner et al. |
| 2001/0025778 | A1 | 10/2001 | Ono |
| 2002/0052237 | A1 | 5/2002 | Magill |
| 2002/0128064 | A1 | 9/2002 | Sobota |
| 2003/0067111 | A1 | 4/2003 | Swan |
| 2004/0259059 | A1 | 12/2004 | Aoki |
| 2005/0083297 | A1 | 4/2005 | Duncan |
| 2005/0215321 | A1 | 9/2005 | Hussaini et al. |
| 2005/0230230 | A1 | 10/2005 | Ueshima et al. |
| 2005/0277470 | A1 | 12/2005 | Watanachote |
| 2006/0025217 | A1 | 2/2006 | Hussaini et al. |
| 2006/0116204 | A1 | 6/2006 | Chen et al. |
| 2007/0281787 | A1 | 12/2007 | Numata et al. |
| 2008/0119291 | A1* | 5/2008 | Takamoto .............. A63F 13/02 463/47 |
| 2008/0188306 | A1 | 8/2008 | Tetterington et al. |
| 2008/0261695 | A1 | 10/2008 | Coe |
| 2009/0054146 | A1 | 2/2009 | Epstein |
| 2009/0088250 | A1 | 4/2009 | Carlson |
| 2009/0258705 | A1 | 10/2009 | Guinchard |
| 2010/0073283 | A1 | 3/2010 | Enright |
| 2010/0167825 | A1 | 7/2010 | Sternberg et al. |
| 2010/0267454 | A1 | 10/2010 | Navid |
| 2010/0304865 | A1 | 12/2010 | Picunko |
| 2011/0065510 | A1* | 3/2011 | Borrel .................... A63F 13/24 463/38 |
| 2011/0105231 | A1 | 5/2011 | Ambinder et al. |
| 2011/0256930 | A1 | 10/2011 | Jaouen |
| 2011/0281649 | A1 | 11/2011 | Jaouen |
| 2012/0088582 | A1 | 4/2012 | Wu et al. |
| 2012/0142418 | A1 | 6/2012 | Muramatsu |
| 2012/0142419 | A1 | 6/2012 | Muramatsu |
| 2012/0172128 | A1 | 7/2012 | Atzom |
| 2012/0260220 | A1 | 10/2012 | Griffin |
| 2012/0299244 | A1 | 11/2012 | Rice et al. |
| 2012/0321093 | A1* | 12/2012 | Borras ................... H02J 3/14 381/56 |
| 2012/0322553 | A1* | 12/2012 | Burgess ................. A63F 13/24 463/37 |
| 2012/0322555 | A1 | 12/2012 | Burgess et al. |
| 2013/0029763 | A1 | 1/2013 | Zhou |
| 2013/0147610 | A1 | 6/2013 | Grant et al. |
| 2013/0150155 | A1 | 6/2013 | Barney et al. |
| 2013/0196770 | A1 | 8/2013 | Barney et al. |
| 2014/0274397 | A1 | 9/2014 | Sebastian |
| 2015/0194279 | A1 | 7/2015 | Rubio |
| 2015/0234479 | A1 | 8/2015 | Schantz et al. |
| 2015/0238855 | A1* | 8/2015 | Uy ........................ G06F 3/0362 463/37 |
| 2015/0255918 | A1 | 11/2015 | Riggs et al. |
| 2015/0321092 | A1* | 11/2015 | Burgess ................. A63F 13/23 463/38 |
| 2015/0321093 | A1 | 11/2015 | Burgess et al. |
| 2016/0082349 | A1 | 3/2016 | Burgess et al. |
| 2016/0193529 | A1 | 7/2016 | Burgess et al. |
| 2016/0346682 | A1* | 12/2016 | Burgess ................. A63F 13/21 |
| 2016/0361636 | A1 | 12/2016 | Gassoway et al. |
| 2017/0001107 | A1 | 1/2017 | Burgess et al. |
| 2017/0001108 | A1 | 1/2017 | Burgess et al. |
| 2017/0087456 | A1 | 3/2017 | Burgess et al. |
| 2017/0151494 | A1 | 6/2017 | Ironmonger et al. |
| 2017/0157509 | A1 | 6/2017 | Burgess et al. |

FOREIGN PATENT DOCUMENTS

| | | |
|---|---|---|
| EP | 1 208 883 | 5/2002 |
| EP | 1852162 | 11/2007 |
| EP | 2 479 636 | 7/2012 |
| EP | 2 440 438 | 4/2013 |
| EP | 2 698 185 | 2/2014 |
| EP | 2 908 224 | 8/2015 |
| GB | 2 244 546 | 12/1991 |
| GB | 2 481 633 | 1/2012 |
| JP | H1020951 | 1/1998 |
| JP | 2001 084077 | 3/2001 |
| WO | WO 02/34345 | 5/2002 |
| WO | WO 03/046822 | 6/2003 |
| WO | WO 2005/103869 | 11/2005 |
| WO | WO 2007/040499 | 4/2007 |
| WO | WO 2008/131249 | 10/2008 |
| WO | WO 2012/036710 | 3/2012 |
| WO | WO2014/187923 | 11/2014 |
| WO | 2015004261 | 1/2015 |
| WO | WO 2015/078990 | 6/2015 |
| WO | 2015110553 | 7/2015 |
| WO | WO 2015/173269 | 11/2015 |

OTHER PUBLICATIONS

Burns, "Review: Scuf Xbox 360 Controller," Xboxer360.com (2010).
"Rapid Fire Mod for Wireless Xbox 360 Controller," forum on xbox-scene.com, (2008).
"Thrustmaster USB game controller roundup," dansdata.com/tmsticks.htm (2002).
Coles, Olin, "Thrustmaster Run-N-Drive PC/PS3 Wireless Gamepad" BenchmarkReviews.com (2009).
Xbox 360 Wireless Controller Tour, published on May 13, 2005 at http://www.ign.com/articles/2005/05/13/xbox-360-wireless-controller-tour.

* cited by examiner

INPUT APPARATUS FOR A GAMES CONSOLE

This application is a U.S. national phase application of Intl. App. No. PCT/GB2018/050604 filed on Mar. 9, 2018, which claims priority from U.S. Ser. No. 62/471,591 filed on Mar. 15, 2017. The entire contents of Intl. App. No. PCT/GB2018/050604 and U.S. Ser. No. 62/471,591 are incorporated herein by reference.

TECHNICAL FIELD

The present invention relates to an input apparatus for a computer, such as, but not limited to, a games console, more particularly, but not exclusively the invention relates to, a hand held controller for a games console.

BACKGROUND

Controllers for most current games consoles are generally intended to be held and operated by the user holding the controller in both hands, such controllers are sometime referred to as "gamepads". A conventional controller will generally comprise a hard outer case with a plurality of controls mounted about the controller. Typically the controls include buttons, analogue control sticks, bumpers and triggers and are provided upon the front or the top of the controller.

An object of the present invention is to provide a controller having at least one control mounted to the rear or back of the controller. It is desirable that the control is detachable, a further object is to provide an improved attachment mechanism.

The present invention seeks to overcome or at least mitigate the problems of the prior art.

SUMMARY

A first aspect of the present invention provides an input apparatus for a computer comprising an outer case having at least one detachably mounted control member, the member comprising first parts of an attachment system for mating with second parts of an attachment system provided on the outer case of the controller, the attachment system comprising a first complementary engagement mechanism, a second complementary engagement mechanism and a complementary locking mechanism, wherein the first complementary engagement mechanism is operably engagable without engaging the second complementary engagement mechanism and the complementary locking mechanism, the second complementary engagement mechanism is operably engagable upon engagement of the first complementary engagement mechanism, the second complementary engagement mechanism is operably engagable without engaging the complementary locking mechanism, the complementary locking mechanism is operably engagable upon engagement of the first and second complementary engagement mechanisms.

Optionally, the first complementary engagement mechanism comprises a first part and a second part, the first part may be one of a tongue and groove; the second part may be the other one of the tongue and groove.

Optionally, the first part and second part are arranged such that the first part is linearly translatable or moveable with respect the second part.

Optionally, the second complementary engagement mechanism comprises a first part and a second part, the first part may be one of a tongue and groove; the second part may be the other one of the tongue and groove.

Optionally, the second complementary engagement mechanism is arranged such that first part is brought into engagement with the second part upon linear movement of the member within a channel provided in the outer case.

Optionally, the complementary locking mechanism comprises a first part and a second part, the first part may be one of a ratchet and pawl; the second part may be the other one of the ratchet and pawl.

Optionally, the complementary locking mechanism is configured such that the first and second parts of the second complementary engagement mechanism may be moved into an at least partially engaged position without bringing the first and second parts complementary locking mechanism into locking engagement.

Optionally, the member is mounted with a channel in the outer case.

Optionally, the channel is a trough.

Optionally, the member is mounted such that at least a portion of the outer surface of the member is substantially flush with a portion of an outer surface of the case.

Optionally, the input apparatus is a hand held controller for a games console and further comprises:
 a plurality of controls located on a front face and top face of the controller;
 the controller being shaped to be held in both hands of a user such that the user's thumbs are positioned to operate controls located on the front of the controller and the user's index fingers are positioned to operate controls located on the top of the controller; wherein
 the controller further comprises at least one additional control located on a back of the controller in a position operable by the middle finger of a user, the at least one additional control comprising the detachably mounted control member at least partially disposed in a respective channel formed in a rear surface of the controller.

Optionally, the channel forms a close fit to the elongate member so as to provide lateral support thereto.

Optionally, a portion of the or each detachably mounted control member is in registry with a switch mechanism disposed within the controller, such that displacement of the member activates the switch mechanism.

Optionally, the additional controls are paddle levers.

A second aspect of the present invention provides an control member for detachable mounting to input apparatus for a computer comprising an outer case one, the control member comprising first parts of an attachment system for mating with second parts of an attachment system provided on the outer case of the controller, the attachment system comprising a first complementary engagement mechanism, a second complementary engagement mechanism and a complementary locking mechanism, wherein the first complementary engagement mechanism is operably engagable without engaging the second complementary engagement mechanism and the complementary locking mechanism, the second complementary engagement mechanism is operably engagable upon engagement of the first complementary engagement mechanism, the second complementary engagement mechanism is operably engagable without engaging the complementary locking mechanism, the complementary locking mechanism is operably engagable upon engagement of the first and second complementary engagement mechanisms.

A third aspect of the present invention provides an control member for detachable mounting to input apparatus for a computer comprising an outer case one, the control member comprising first parts of an attachment system for mating with second parts of an attachment system provided on the outer case of the controller, the attachment system comprising a first complementary engagement mechanism, a second complementary engagement mechanism and a complementary locking mechanism, wherein a first part of the first complementary engagement mechanism comprises a first tongue for sliding engagement within a first groove and a first part of the second complementary engagement mechanism comprises a second tongue engaging within a second groove and a first part the complementary locking mechanism comprises a pawl for engaging with a ratchet.

Optionally, the first tongue comprises at least one end stop for limiting linear movement of the first tongue with respect to the first groove.

A fourth aspect of the present invention provides an hand held controller for a games console comprising:
an outer case;
a plurality of controls located on a front face and top face of the controller;
the controller being shaped to be held in both hands of a user such that the user's thumbs are positioned to operate controls located on the front face of the controller and the user's index fingers are positioned to operate controls located on the top face of the controller;
wherein the controller further comprises a channel a back face of the controller for receiving at least one additional control member located and arranged such that the at least one additional control member is in a position operable by the middle finger of a user, the channel comprising second parts of an attachment system for mating with first parts of an attachment system provided a control member, the attachment system comprising a first complementary engagement mechanism, a second complementary engagement mechanism and a complementary locking mechanism, and
wherein a second part of the first complementary engagement mechanism comprises a first groove for sliding engagement with a first tongue, the first groove defined at least in part by a projection from a side wall of the channel, the projection defining an undercut, and
wherein a second part of the second complementary engagement mechanism comprises a second groove for engaging within a second tongue, the second groove defined at least in part be a recess in an opposing side wall of the channel, and
wherein a second part the complementary locking mechanism comprises a ratchet for engaging with a pawl the ratchet being provided on a rear face of the outer case.

Optionally, the ratchet is collinear with the channel.

Further features and advantages of the present invention will be apparent from the specific embodiments illustrated in the drawings and discussed below.

Within the scope of this application it is envisaged and intended that the various aspects, embodiments, examples, features and alternatives set out in the preceding paragraphs, in the claims and/or in the following description and drawings may be considered or taken independently or in any combination thereof.

Features or elements described in connection with, or relation to, one embodiment are applicable to all embodiments unless there is an incompatibility of features. One or more features or elements from one embodiment may be incorporated into, or combined with, any of the other embodiments disclosed herein, said features or elements may be in addition to, or in replacement of one or more features or elements of said other embodiment.

A feature, or combination of features, of an embodiment disclosed herein may be extracted in isolation from other features of that embodiment. Alternatively, a feature, or combination of features, of an embodiment may be omitted from that embodiment.

BRIEF DESCRIPTION OF THE DRAWINGS

Exemplary embodiments of the invention will now be described with reference to the accompanying drawings, in which.

DETAILED DESCRIPTION

Detailed descriptions of specific embodiments of an input apparatus, a controller, an additional control component and a method are disclosed herein. It will be understood that the disclosed embodiments are merely examples of the way in which certain aspects of the invention can be implemented and do not represent an exhaustive list of all of the ways the invention may be embodied. As used herein, the word "exemplary" is used expansively to refer to embodiments that serve as illustrations, specimens, models, or patterns. Indeed, it will be understood that the input apparatus, the controller, the additional control component and the method described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1A:
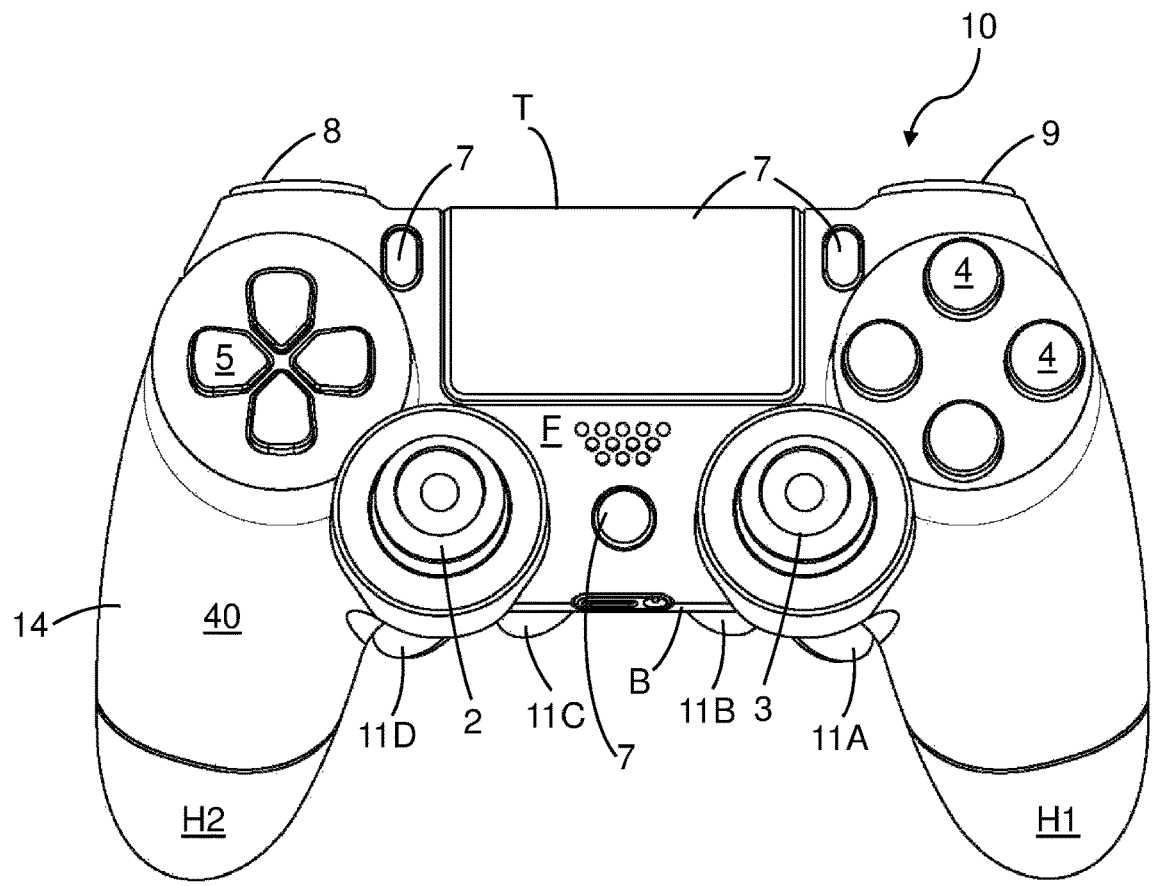
FIG. 1A is a schematic illustration of the front of an input apparatus for a games console controller according to an embodiment of the present disclosure.

Referring to FIG. 1A there is shown a plan view from above of the front of an input apparatus 10 for a use with a computer. The input apparatus 10 illustrated takes the form of a controller 10 or game pad 10 for use with a video games console or similar. In other embodiments the input apparatus 10 may take the form of a handheld games console or other mobile device such as but not limited to a smartphone, tablet computer, phablet or the input apparatus 10 may be an accessory device (such as, but not limited to, a sleeve or case) for use with such a mobile device.

The apparatus or controller 10 comprises an outer case or shell 14. The case 14 may comprise one or more panels fitted together and or mounted to a chassis member. The case 14 may comprise a front body panel 40 and a rear body panel 42 (see FIG. 1B). The outer case 14 comprises a void in which electronic components (such as, but not limited to, switches 48 and/or sensors) are located.

The apparatus or controller 10 comprises a plurality of controls which are mounted to the front F and to the top T of the controller 10. As used herein the term "front" refers to an upper surface of the controller 10 when in normal use held in both hands, whilst the term "top" refers to a leading edge of the controller 10 which typically faces away from a user when held in both hands. A rear or back of the controller opposes the "front" and typically will form a lower surface, whilst the term "bottom" refers to a trailing edge of the controller 10 which typically faces towards the user when held in both hands. The controller 10 comprises a plurality of buttons which when activated initiate a specific action or control function. The controller 10 comprises at least one omnidirectional control stick or button which is operable to provide directional input.

Specifically, in the illustrated example shown, the controller 10 comprises first, left, and second, right, analogue control sticks, also known as thumb sticks 2, 3. The first left 2 and second right 3 thumb sticks normally control movement and are intended to be operated by the user's left and right thumbs respectively. Left and right thumb sticks 2, 3 are mounted to the front face F of the controller 10. The left thumb stick 2 is located in a rearward (or lower i.e. nearer the bottom face of the controller 10) left region of the front face F; and right thumb stick 3 is located in a rearward (or lower i.e. nearer the bottom face of the controller 10) right region of the front face F. There are four buttons 4, located on a forward (or upper i.e. nearer the top face of the controller 10) right portion of the front face F of the controller 10. The four buttons 4 normally control additional actions and are intended to be operated by the user's right thumb. There is a direction pad 5 located on the forward (or upper) left portion of the front face F of the controller 10. The direction pad 5 is intended to be operated by the user's left thumb, typically either as an alternative to the left thumb stick 2 or to provide additional action controls. A left shoulder button or bumper 8 and a right shoulder button or bumper 9 are located on the top face T of the controller 10. A left trigger 6 and a right trigger 7 are also located on the top face T of the controller 10 (see FIG. 1B). The left and right triggers 6, 7 are typically operated by a user's index fingers. The left and right bumpers 8, 9 may also be operated by a user's index fingers. The left and right triggers 6, 7 may be analogue in nature, or may comprise a plurality of discrete digital states, that is to say the input control may be dependent upon the degree of depression or displacement of the trigger body.

The controller 10 may comprise one or more additional input buttons 7, the buttons 7 may take the form of one or more digital or analogue buttons, or may be in the form of a touch pad or touch screen.

In order to operate any of the buttons 4 a user will normally remove their right thumb from the right thumb stick 3 so as to depress one or more of the buttons 4. Switching between the right thumb stick 3 and the buttons 4 takes time since the user's thumb must traverse the distance therebetween. This may also cause a loss of, or reduction in, control in some games because the user has to relinquish control over the right thumb stick 3 in order to control the buttons 4. This may be a particular problem in games where the right thumb stick 3 is used for aiming. A similar problem may arise in games where the direction pad 5 provides additional actions and the user has to remove their left thumb from the left thumb stick 2 in order to operate the direction pad 5.

In light of the above, the present disclosure provides an improved controller which removes the requirement for a user to remove their thumb from the left or right thumb stick 2, 3 in order to operate additional actions controlled by the four buttons 4 and/or the direction pad 5.

Figure 1B:
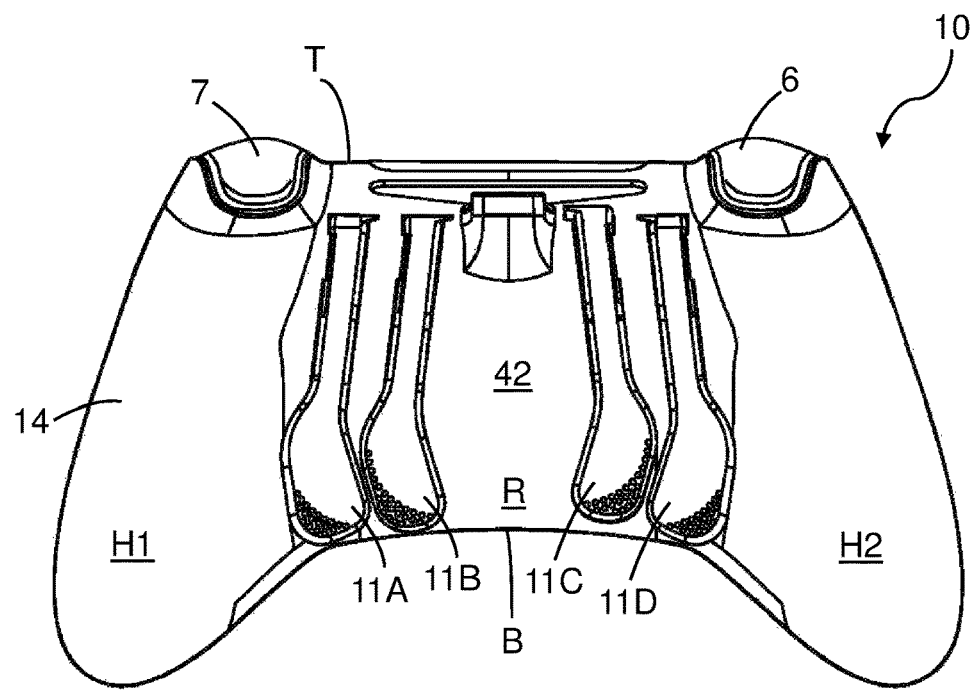
FIG. 1B is a plan view from below of the rear of the input apparatus of FIG. 1, the apparatus comprising additional controls mounted thereto.

The rear of the apparatus 10 according to an embodiment of the present disclosure is illustrated in FIG. 1B.

The apparatus 10 comprises one or more additional controls 11A, 11B, 110, 11D mounted to the rear R or back of the apparatus 10, where the rear R or back face is opposite the top face F (the face F to which the buttons 4, left and right thumb sticks 2, 3 and direction pad 5 are mounted).

In the illustrated apparatus 10, the apparatus comprises four additional controls 11A, 11B, 11C, 11D. In other embodiments, more or fewer additional controls 11A, 11B, 110, 11D may be provided. The additional controls 11A, 11B, 11C, 11D, also referred to herein as paddle levers, each comprise a member M, see FIGS. 12A to 13B. Each member M may be elongate, that is to say the member M comprises a first end E1 and a second end E2 the distance between the first and second ends E1, E2 is greater than a width of the member M. The member M may be bent, twisted or folded in one or more directions. This is best illustrated in FIGS. 12A to 13B. The paddle levers 11A, 11B, 11C, 11D may be orientated such that at least a portion of the member M is substantially parallel with respect to one of a first and second handle portions H1, H2 of the controller 10. The members M are each positioned to be operable by the middle, ring or little fingers of a user 12. These are the fingers normally used to grasp first and second handle portion H1, H2 which thus brings them into proximity with the rear face of the controller 10.

In some embodiments the members M are formed from a thin, flexible material such as a plastics material, for example polyethylene. In other embodiments, the members may be formed from a metallic material. Other suitable materials may be used.

Figure 11B:
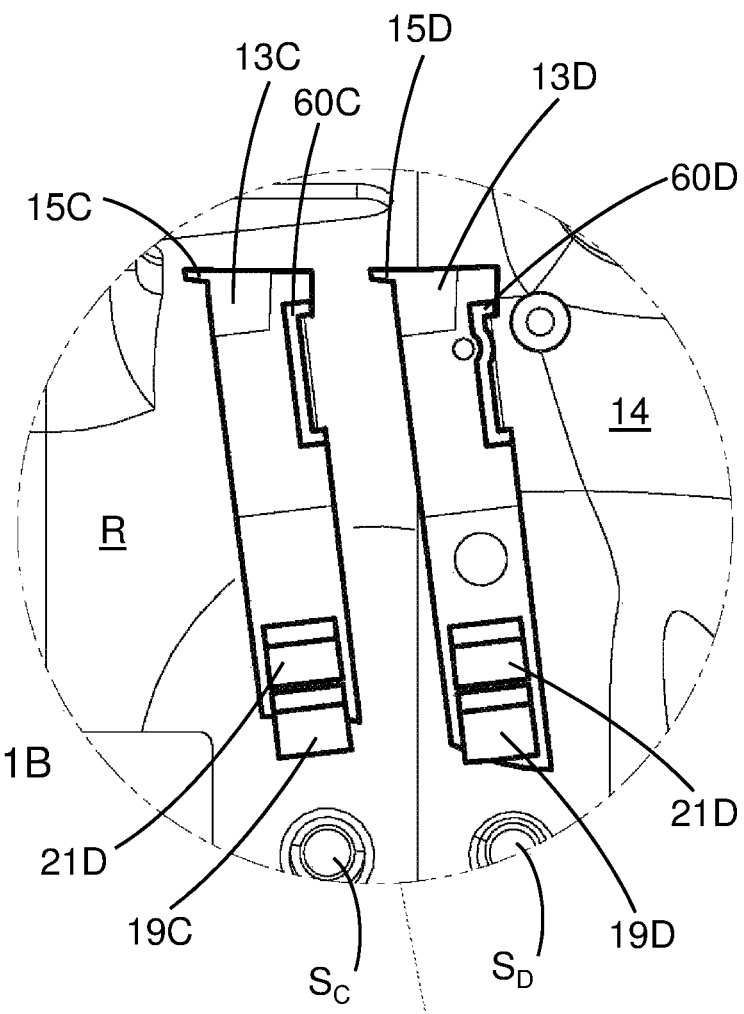
FIG. 11B is an enlarged view of a portion of the plan view of FIG. 11A.
Figure 11A:
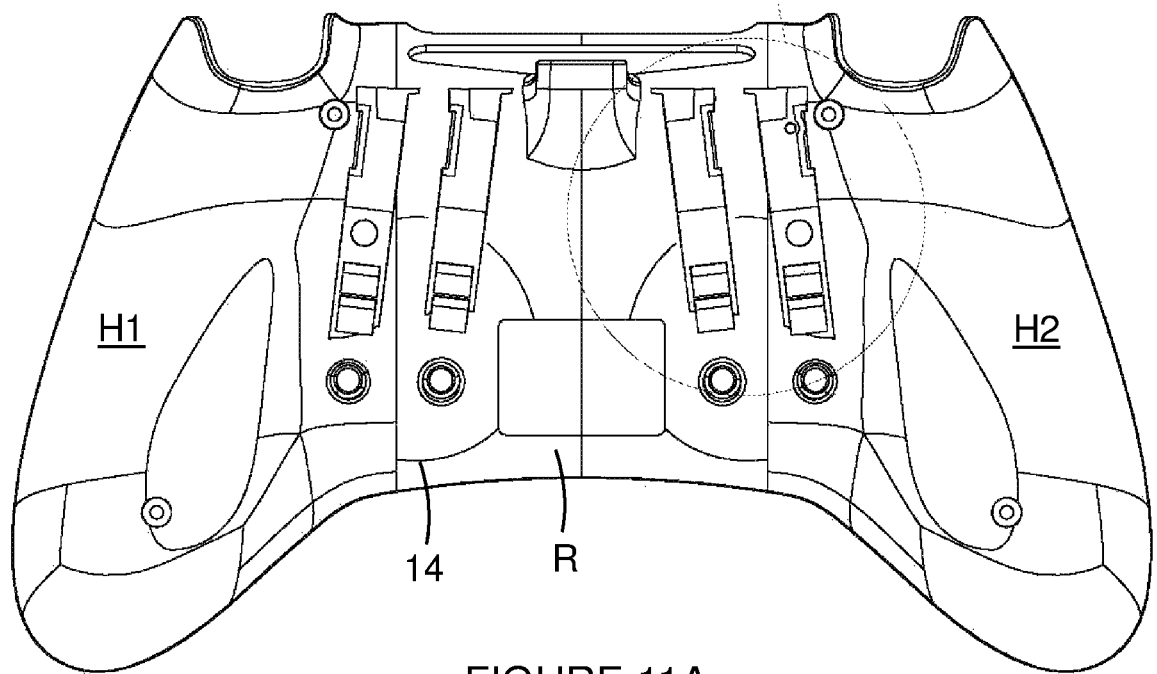
FIG. 11A is a plan view from below of the rear panel of the input apparatus of FIG. 1B.
Figure 12C:
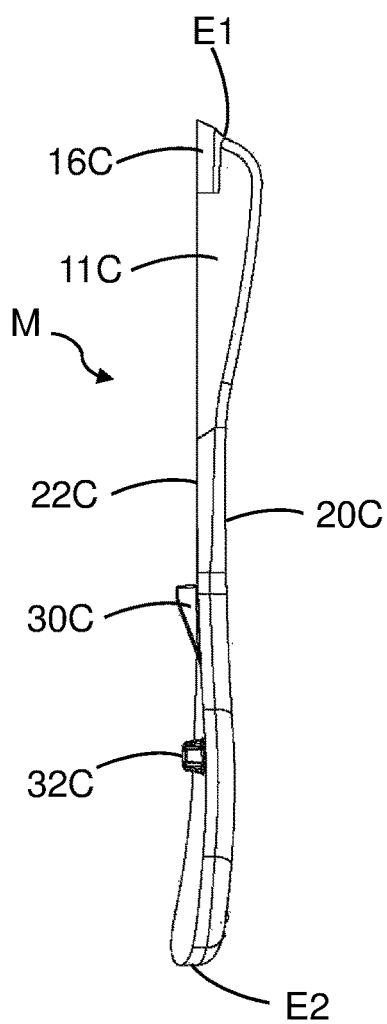
FIG. 12C is a first side view of the component of FIG. 12A.
Figure 12B:
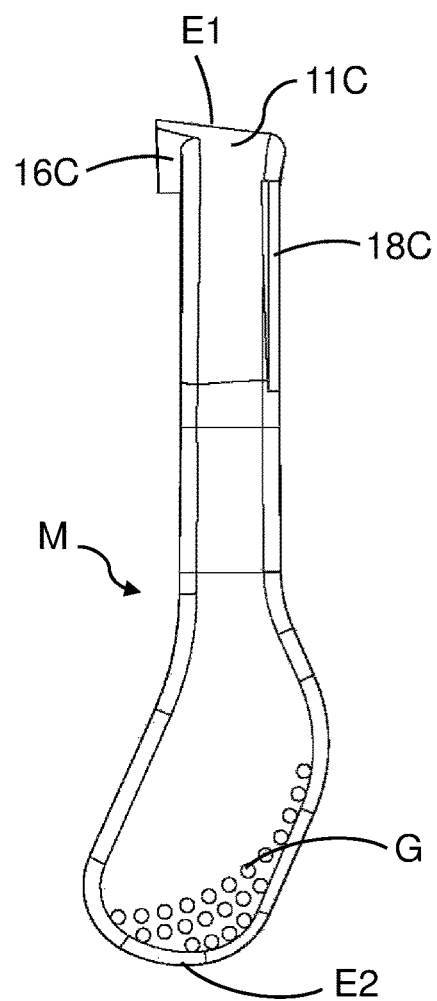
FIG. 12B is a plan view from below of the component of FIG. 12A.
Figure 12A:
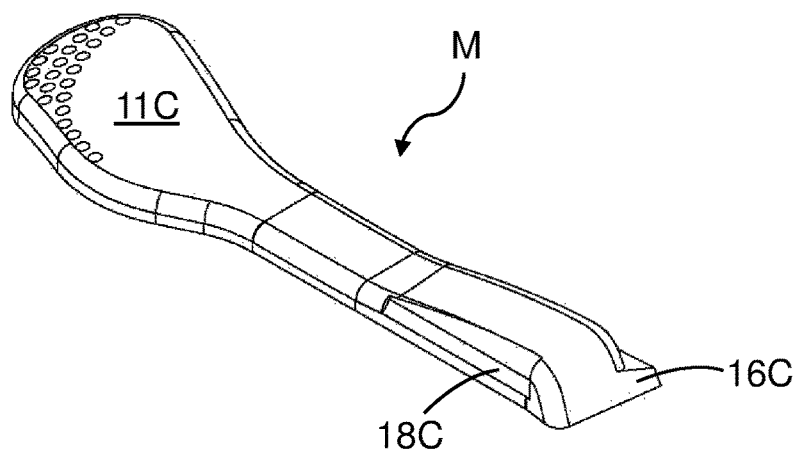
FIG. 12A is a perspective view from below of an additional control component for attachment to the rear of the input apparatus of FIG. 1B.
Figure 13A:
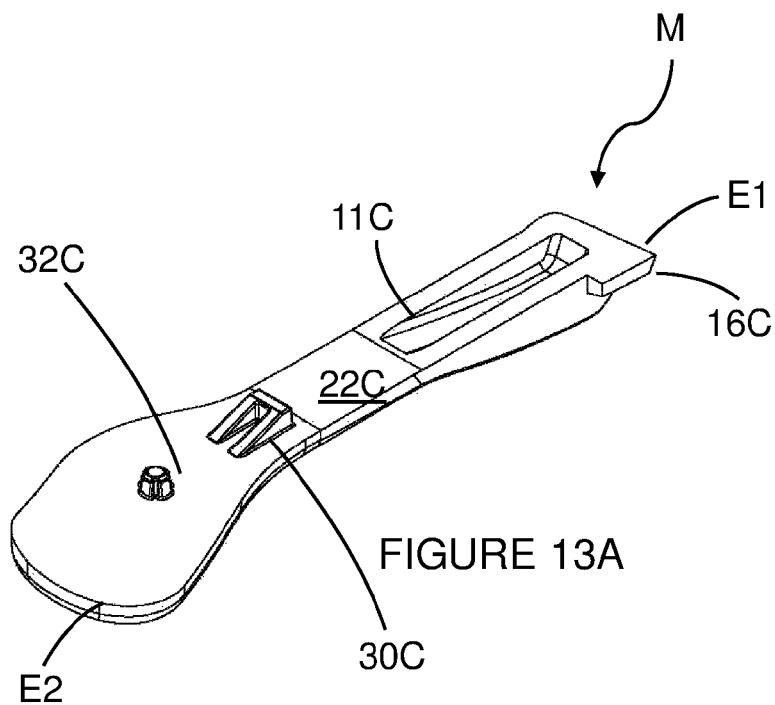
FIG. 13A is a perspective view from above of the additional control component of FIG. 12A.
Figure 13B:
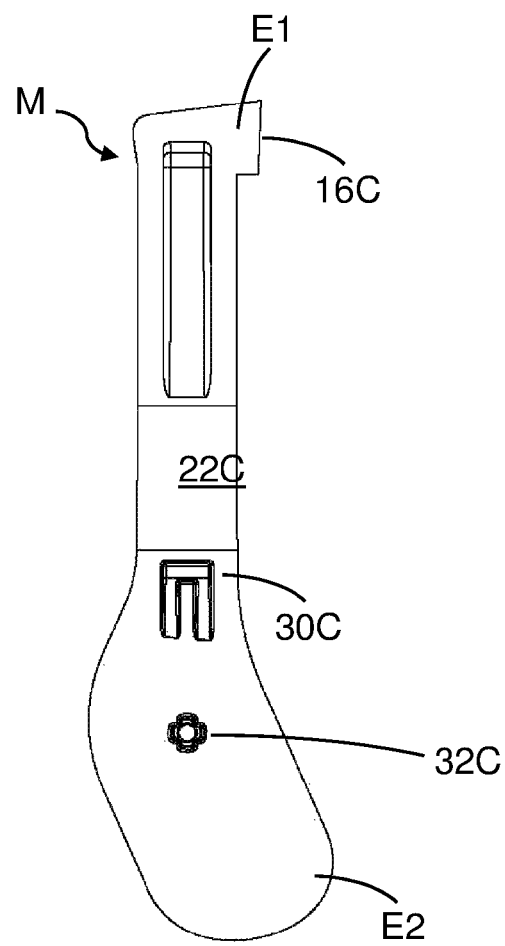
FIG. 13B is a plan view from above of the additional control component of FIG. 12A.

A switch mechanism $S_A$, $S_B$, $S_C$, $S_D$ as shown in FIGS. 11A and 11B is mounted within the controller 10 in vertical registry with a portion of each paddle lever 11A, 11B, 11C, 11D. A portion of the switch mechanism $S_A$, $S_B$, $S_C$, $S_D$ may extend through the controller body and be disposed in close proximity to, or in contact with, an innermost surface of the paddle levers 11A, 11B, 11O, 11D.

The rear body panel 42 comprise a plurality of apertures A which are configured and arranged to be in vertical registry with a portion of a respective one of the paddle levers 11A, 11B, 11C, 11D. The apertures A enable the respective paddle lever 11A, 11B, 11C, 11D to engage with a switch mechanism $S_A$, $S_B$, $S_C$, $S_D$ mounted within the controller 10. The switches $S_A$, $S_B$, $S_C$, $S_D$ are coupled to control electronics and enable the controller 10 to sense depression or displacement of the paddle levers 11A, 11B, 11C, 11D.

The paddles 11A, 11B, 11C, 11D may be resiliently biased, that is to say that they return to an unbiased or rest position when not under load for example when depressed by a user. The bias may be provided by a resilient biasing device, it may be provided by, or integrated, with a switch mechanism or it may be as a result of the inherent elasticity of the material from which the member is constructed. A user may displace or depress any of the paddle levers 11A, 11B, 11C, 11D by engaging an outer surface thereof; such displacement causes a paddle lever 11A, 11B, 11C, 11D to activate a switch mechanism $S_A$, $S_B$, $S_C$, $S_D$ (as shown in FIGS. 11A and 11B) mounted within the outer case of the controller 10. The paddle levers 11A, 11B, 11C, 11D are mounted between the first handle portion H1 and the second handle portion H2 located on the base of the controller 10, and are disposed so as to be in close proximity to an outer surface of the controller body.

Figure 5:
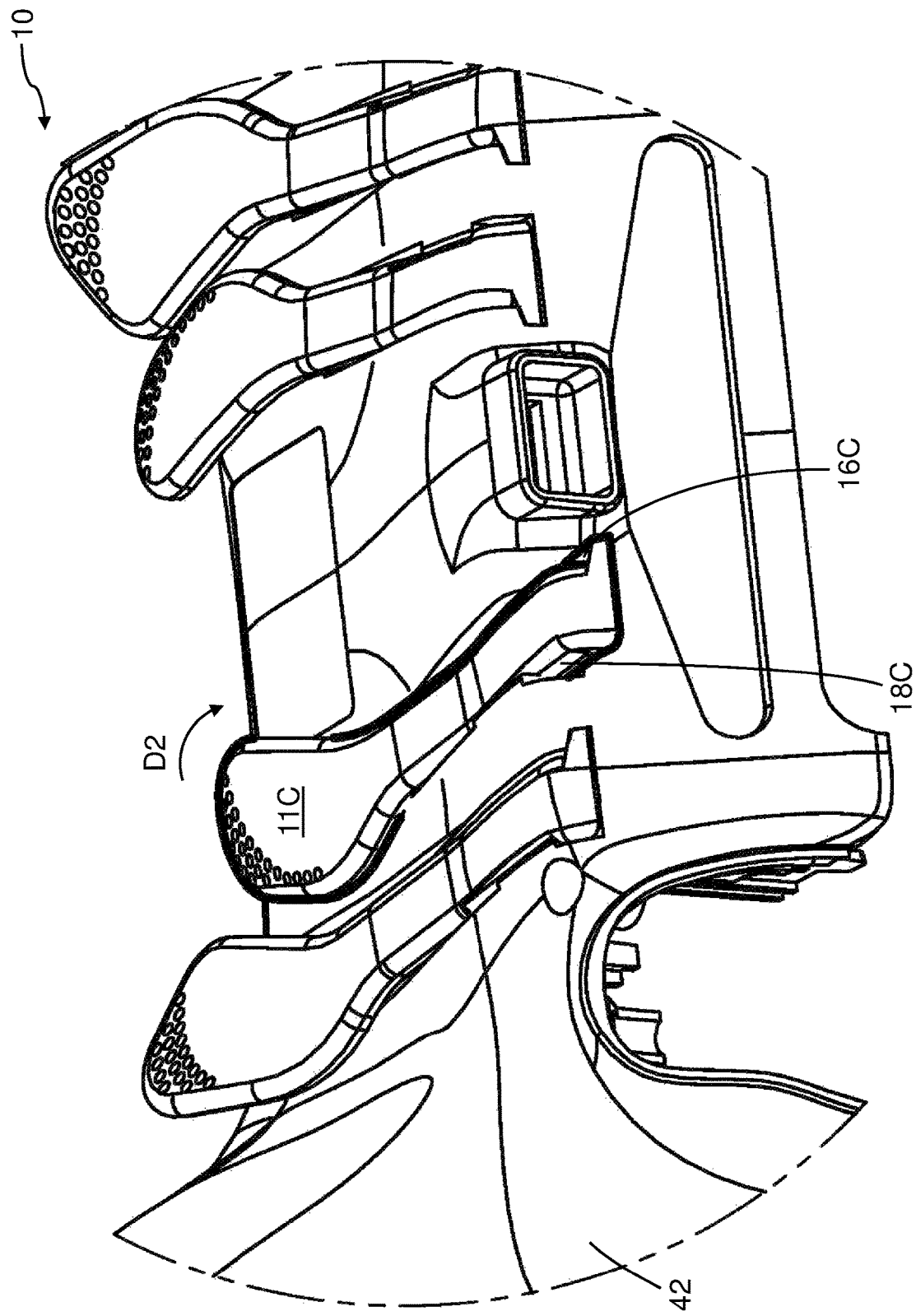

The rear face R of the controller 10 is provided with one or more channels 13A, 13B, 13C, 13D, best shown in FIGS. 10A to 11B. A channel 13A, 13B, 13C, 13D is provided for receiving a respective one of the members M of each of the plurality of additional controls 11A, 11B, 11C, 11D. Each channel receives a respective one of the paddle levers (also referred to herein as paddles) 11A, 11B, 11C, 11D. In the illustrated embodiment the channels 13A, 13B, 13C, 13D are arranged to receive a first end portion of the respective paddle levers 11A, 11B, 11C, 11D. This is achieved by reducing the depth of the channels 13A, 13B, 13C, 13D towards one end to nothing the height of the side walls 52, 54 of the channels 13A, 13B, 13C, 13D reduces to zero, such that the channels 13A, 13B, 13C, 13D are tapered. In this way, a second end E2 of each of the paddle levers 11A, 11B, 11C, 11D stands proud of the base B of the controller 10. A portion of each member M proximate the second end E2 extends over the outer surface of the rear face of the controller 10, (this is best shown in FIG. 5). In this way a user can readily engage with the paddles 11A, 11B, 11C, 11D. The channels 13A, 13B, 13C, 13D provide stability to the paddles 11A, 11B, 11C, 11D. This increases the durability of the paddles 11A, 11B, 11C, 11D.

In some embodiments the portion of each member M received in the channels 13A, 13B, 13C, 13D is arranged such that an outermost surface 20C proximate the first end E1 is arranged to be substantially flush with portions of outer surface of the rear face R of the controller 10 disposed on one or both sides of the respective channel 13A, 13B, 13C, 13D.

In other embodiments the member M and channels 13A, 13B, 13C, 13D may be configured such that the outermost surface 20C stands proud of the outer surface of the rear face R of the controller 10 disposed on one or both side of the respective channel 13A, 13B, 13C, 13D.

In still other embodiments the member M and channels 13A, 13B, 13C, 13D may be configured such that the outermost surface 20C is inset or recessed with respect to portions of outer surface of the rear face of the controller 10 disposed on one or both side of the respective channel 13A, 13B, 13C, 13D.

The channels 13A, 13B, 13C, 13D reduce the likelihood of the paddles 11A, 11B, 11C, 11D rotating about the fixing end when engaging with the moveable end. The channels serve to restrict lateral movement of the paddles 11A, 11B, 11C, 11D.

The member M of each additional control 11A, 11B, 11C, 11D comprise an attachment mechanism. The attachment mechanism does not require any tools for the attachment of the members M to the controller 10 or the removal of the members M from the controller 10.

The attachment mechanism comprises a first tongue 18C provided on a first side edge of the member M, a second tongue 16C provided on a second side edge of the member M (the second side edge opposing the first side edge) and a detent or pawl 30C mounted to an inner surface 22c of the member M. The attachment mechanism comprises a first undercut 17C, 17D in a first side wall of each channel 13A, 13B, 13C, 13D and a second undercut 15C, 15D in a second side wall of each channel 13A, 13B, 13C, 13D (the second side edge opposing the first side edge) and second detent or ratchet 190/210 in the base wall or floor of the channel 13a, 13B, 13C, 13D.

FIGS. 3 to 9 illustrate stages of insertion of the member M of a third additional control 11C into a respective third channel 13C.

Figure 3:
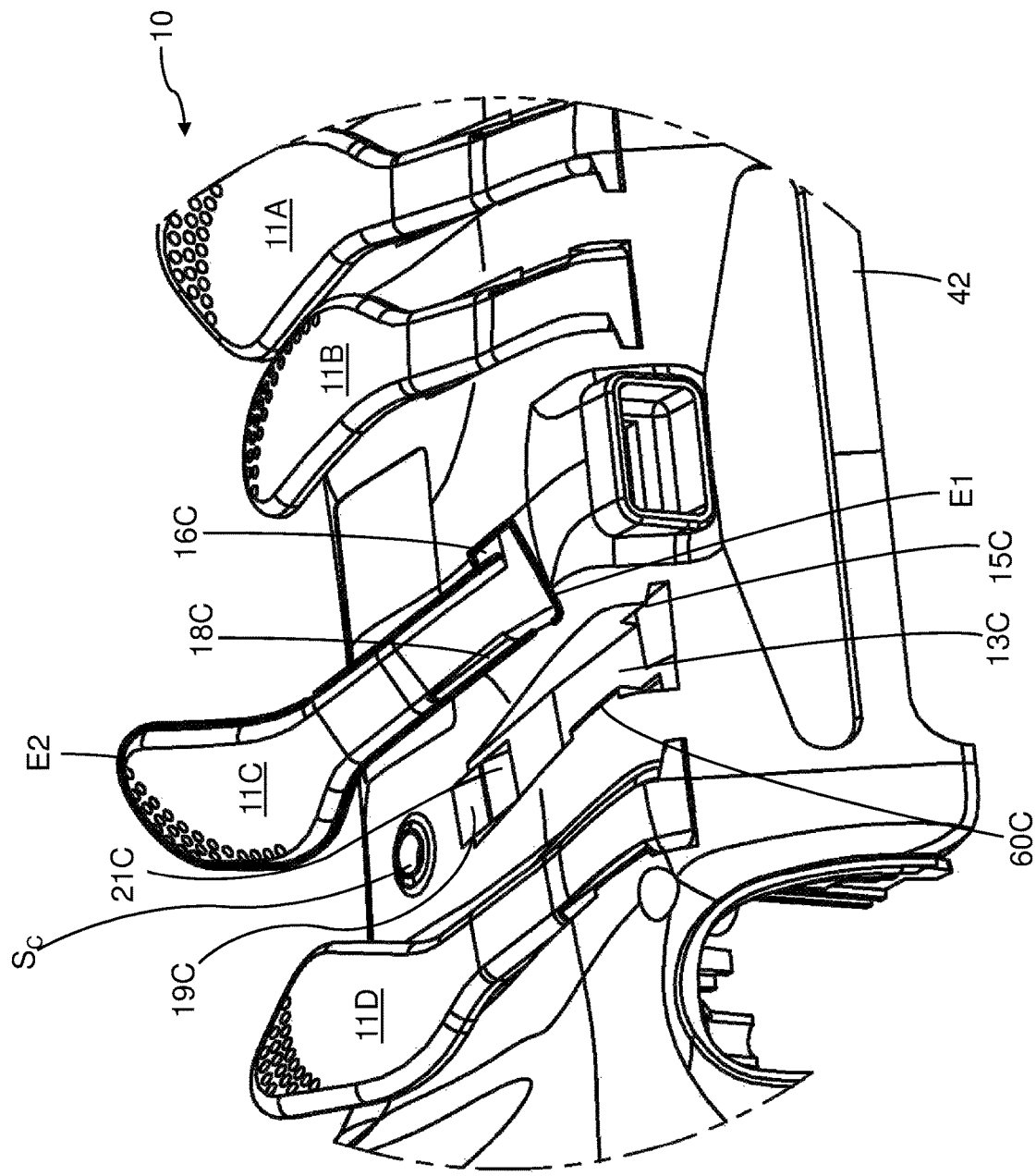
FIGS. 3 to 5 are perspective views from below of a rear panel of the input apparatus shown in FIGS. 1A and 1B, showing stages of assembly of an additional control.

The member M is rotated such that a first side edge including the first tongue 18C can be inserted into the channel 13C, as shown in FIG. 3.

Figure 4:
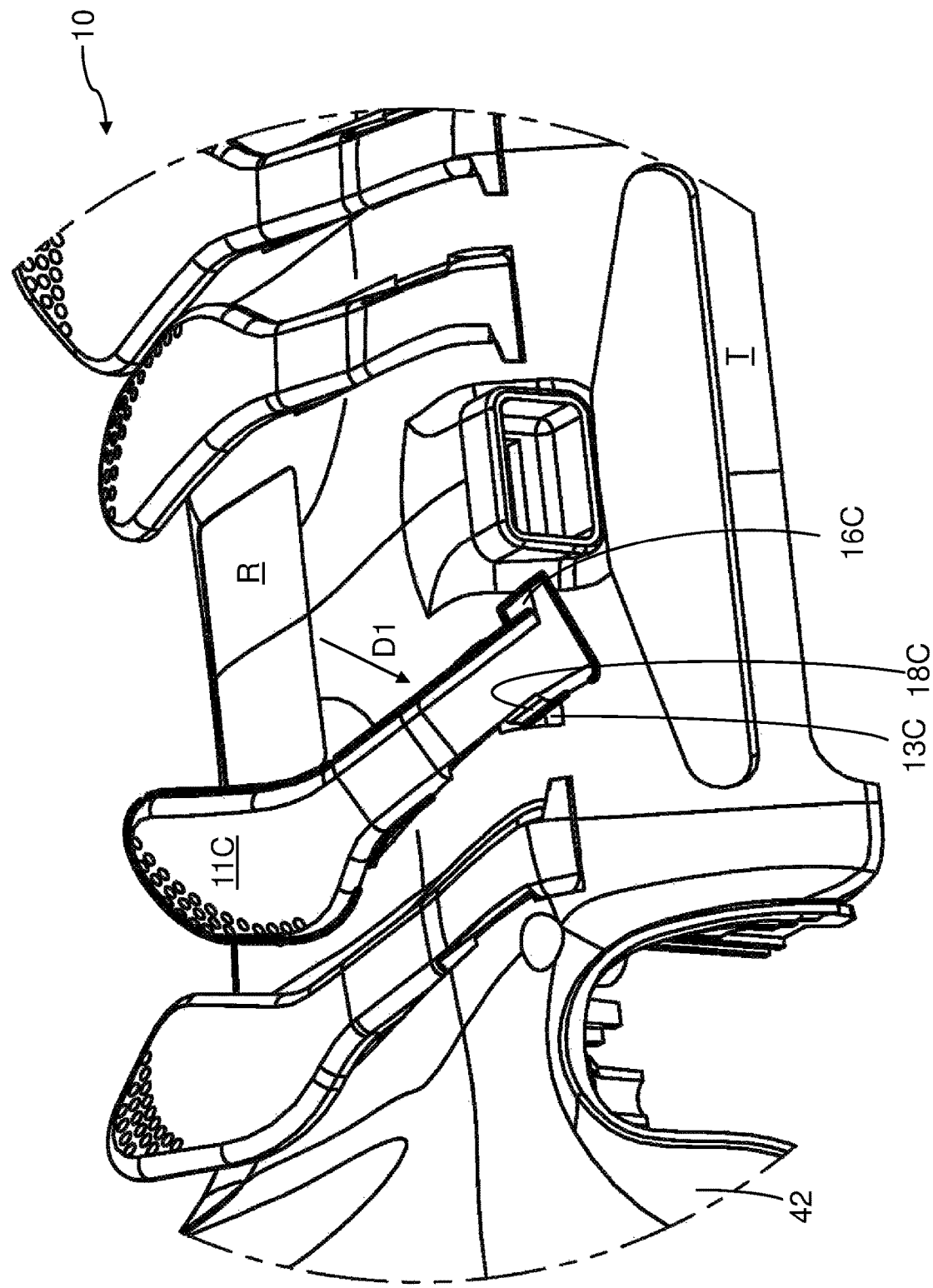

The first tongue 18C is inserted so as to be received in the first undercut 17C. The first undercut 17C is defined by a lateral projection or lug 60C extending from a first side wall of the channel 13C. The first tongue 18C is received by the undercut as shown in FIG. 4. The first tongue 18C is longer in length than the lug 60C. In this way the member M can be inserted into the channel 13C such that the first end E1 of the member M is offset longitudinally from the end of the channel 13C. The member M can then be rotated about its longitudinal axis as illustrated in FIG. 5 such that the member M can be slid longitudinally in the channel 13C, the second tongue 16C can be inserted into a groove or recess in the second side wall of the channel 13C, as shown in FIG. 6, the recess provides the second undercut 15C.

The first and second undercuts 17C, 15C together with the floor or base of the channel 13C define at least in part a respective groove in which one of the first and second tongues 18C, 16C is received.

Figure 6:
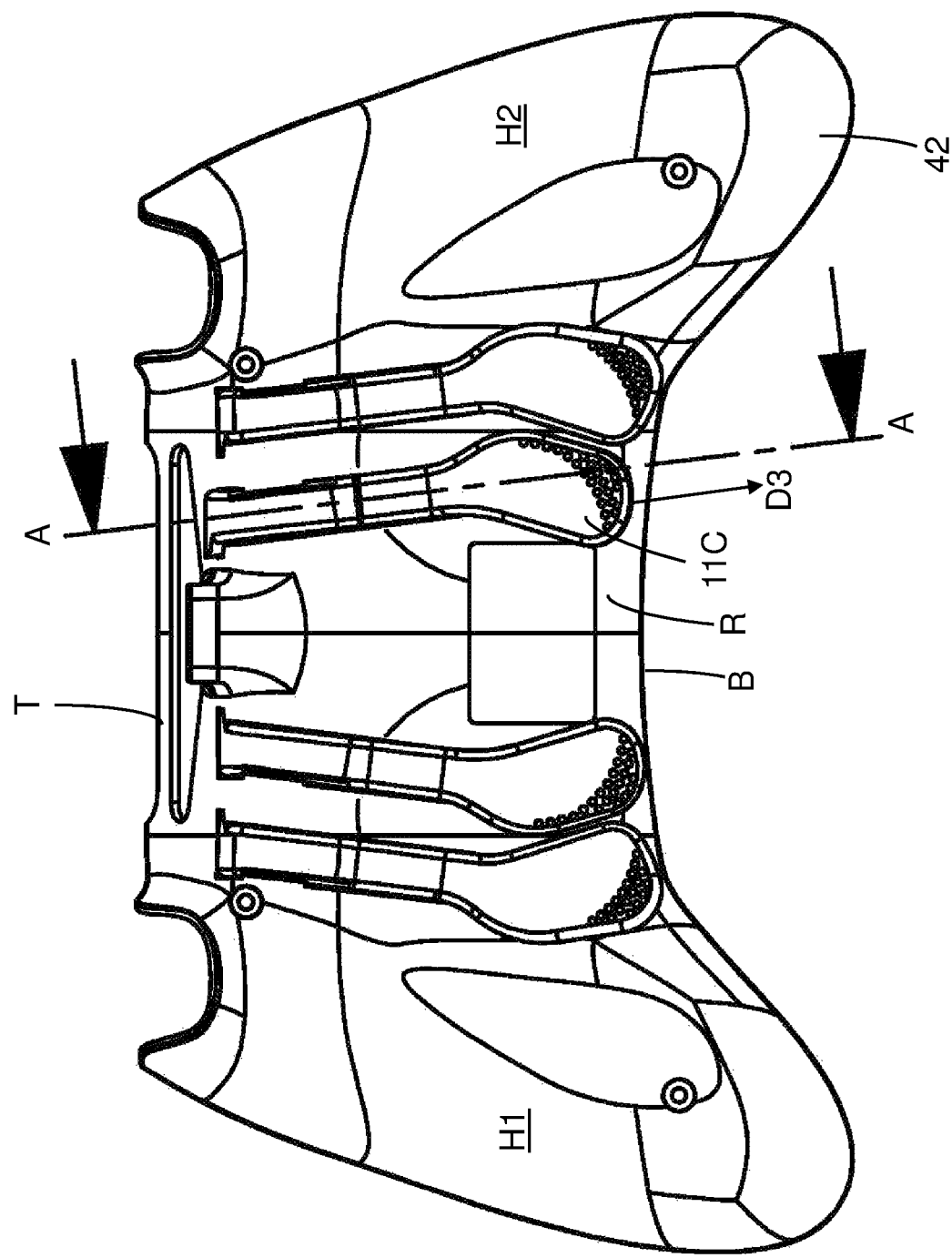
FIG. 6 is a plan view from below of the rear panel of the input apparatus of FIG. 1B showing another stage of assembly of an additional control.
Figure 7:
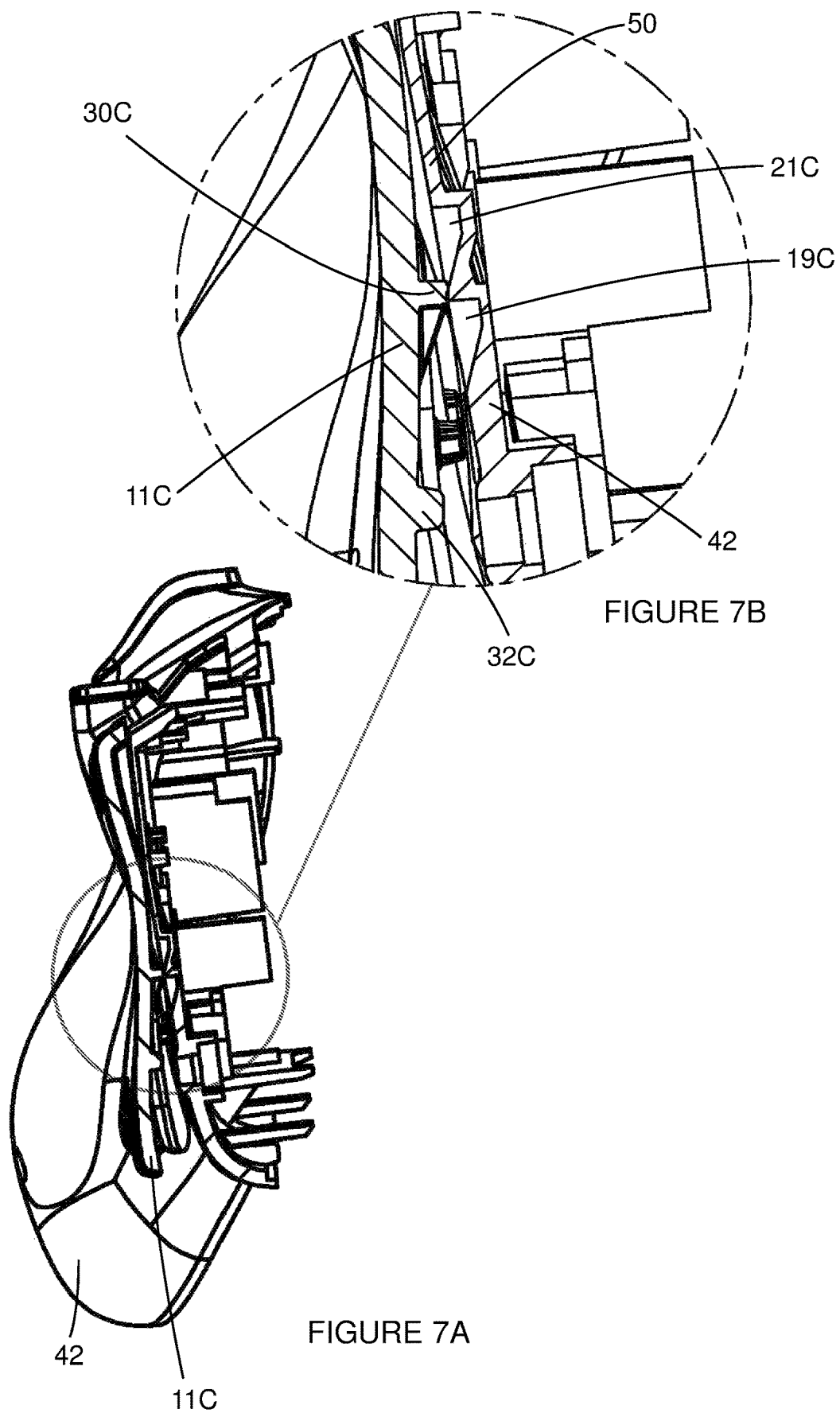
FIG. 7A is a sectional view along the line A-A shown in FIG. 6.
FIG. 7B is an enlarged view of a portion of the sectional view of FIG. 7A.

The member M in the position illustrated in FIG. 6 is held in the channel 13C by the first and second undercuts 17C, 15C which extend over at least a portion of each of the respective ones of the first and second tongues 18C, 16C.

Figure 8:
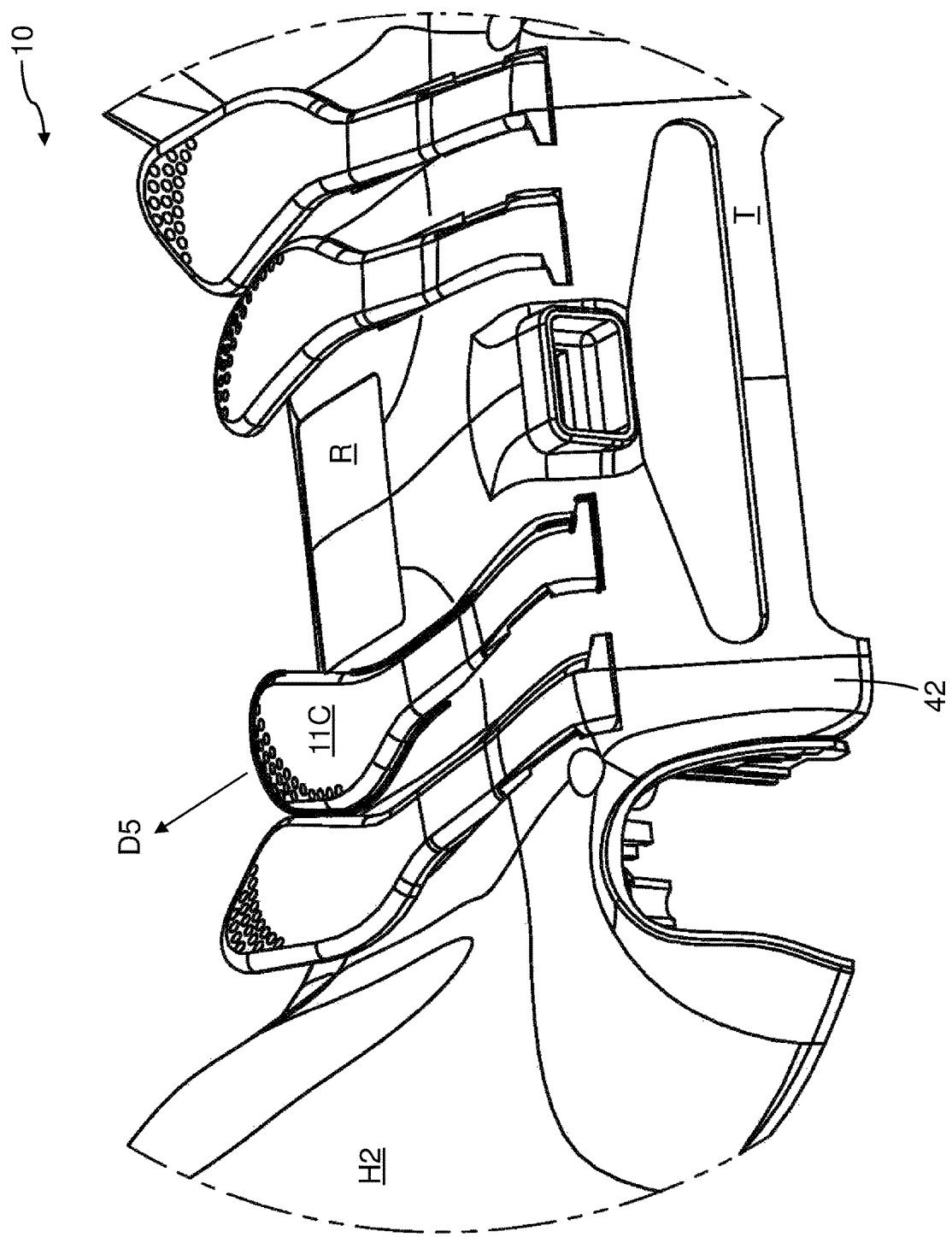
FIG. 8 is a perspective view from below of a rear panel of the input apparatus of FIG. 1B showing yet another stage of assembly of an additional control.
Figure 9:
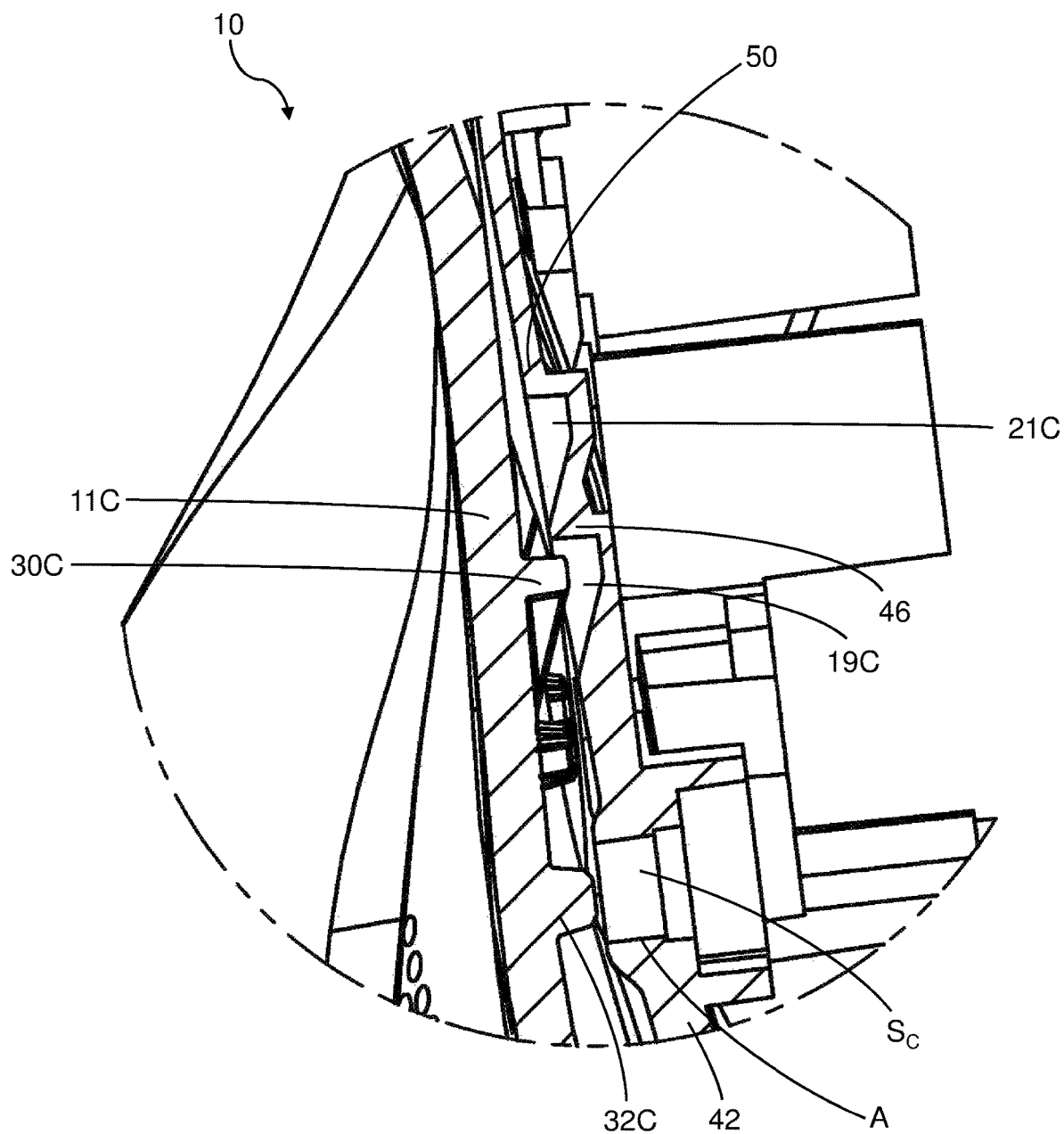
FIG. 9 is a view of the portion of the sectional view of FIG. 7B showing the additional control in the stage of assembly of FIG. 8.
Figure 10B:
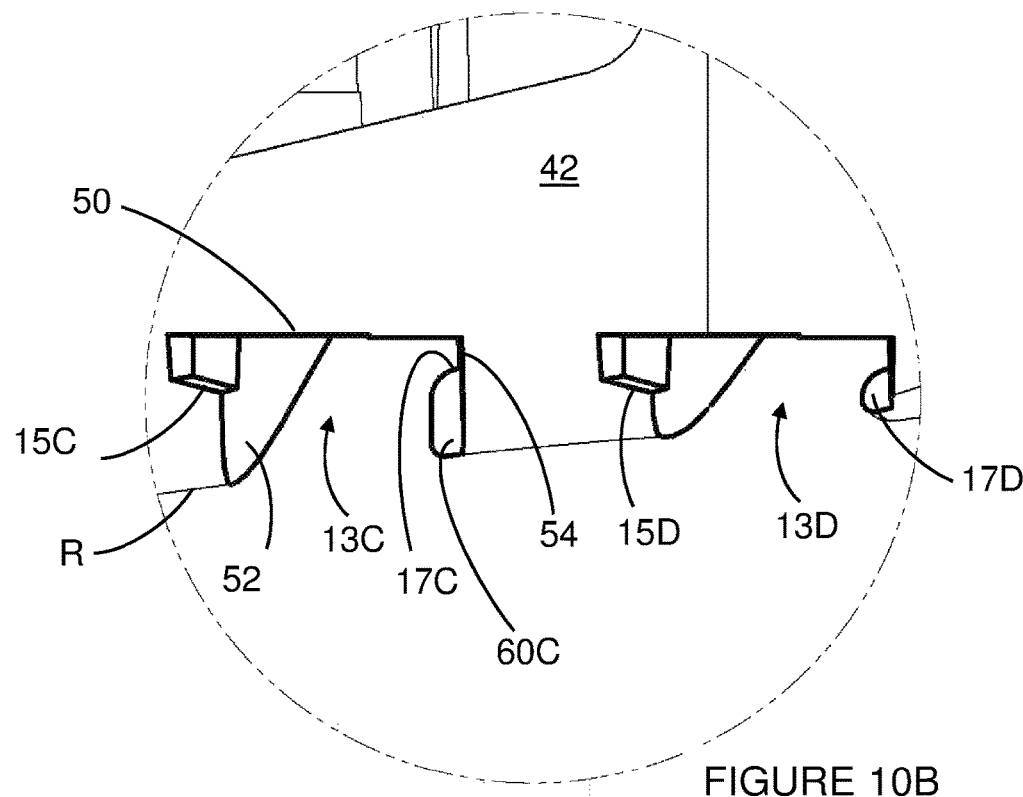
FIG. 10B is an enlarged view of a portion of the top view of FIG. 10A.
Figure 10A:
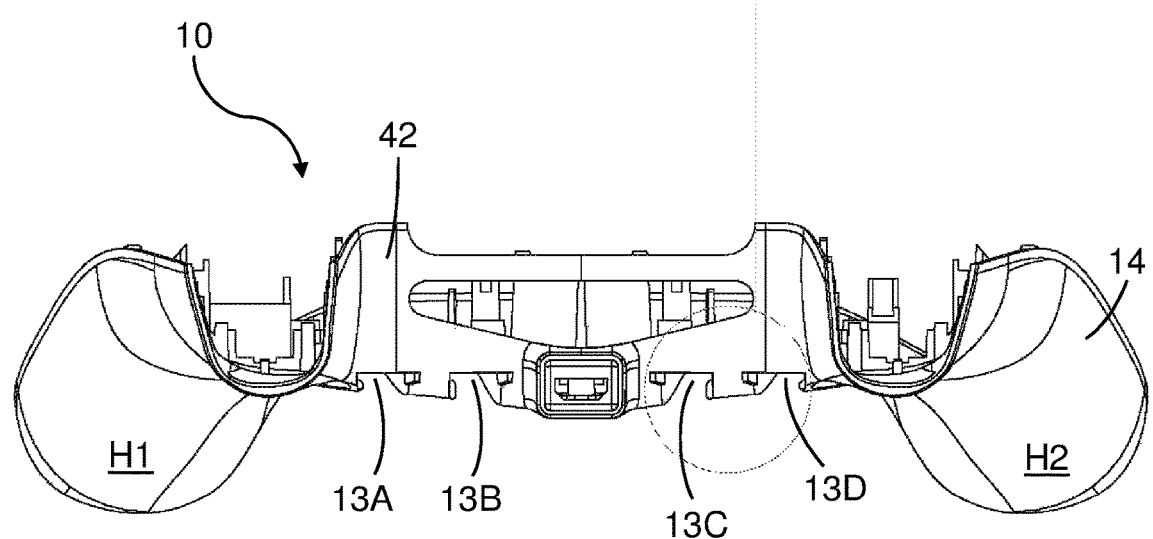
FIG. 10A is an top view of the rear panel of the input apparatus of FIG. 1B in which the additional controls have been removed to illustrate channels.

In order to secure the member M within the channel the member M is slid along the channel 13C such the detent or pawl 30C is locks with the ratchet 190/210. The detent 30C is translated along the ratchet so that the detent 30c moves from a position within a first recess 19C (as shown in FIG. 7B) beyond a ramp or sawtooth 46 so as to be disposed within a second recess 21C, as shown in FIG. 9. The sawtooth 46 is shaped to prevent or inhibit the member M from being slid in the reverse direction. FIG. 8 illustrates the member M fully inserted or engaged within the channel 13C. In this position the second tongue 16C is fully engaged within the recess in the second side wall of the channel 13C.

Optionally, the second tongue 16C may comprise a lip or ridge to prevent overtravel or over insertion of the member M along the channel 13C. Alternatively, the second tongue may contact or engage with a closed end or the recess providing the first undercut 15C.

The second tongue 18C may also be provided with end stops to limit the longitudinal travel of the member M within the channel 13C.

In order to remove the member M from the channel 13C the member M is displaced or deformed outwardly such that the detent 30C is withdrawn from the second recess 21C. The member M can then be slid along the channel in a direction towards the top face or edge T of the controller 10 until the second tongue 16C is disengaged from the second undercut 15C.

Once the second tongue 16C is disengaged from the second undercut 15C the member M can be rotated out of the channel 13C in doing so the first tongue 18C is removed from below the first undercut 17C.

A user may engage the paddles 11A, 11B, 11C, 11D with the tips of the fingers, preferably the middle fingers, without compromising their grip on the controller 10. However, it is envisaged that a user could use the ring or little finger. The index fingers may simultaneously engage trigger style controls mounted on the forward end of the controller 10 whilst the thumbs may be used to activate controls on the top of the controller 10.

FIGS. 12A to 13B show views of a paddle lever 110 suitable for attachment to the rear body panel of the controller 10.

The paddles 11A, 11B, 11C, 11D are elongate in shape and substantially extend in a direction from the front to the rear of the controller 10. In one embodiment, the paddles are orientated such that they converge towards the forward end with respect to one another; in an alternative embodiment, the paddles are orientated parallel with respect to one another. The elongate shape of the paddles allows a user to engage the paddles with any of the middle, ring or little fingers; it also provides that different users, having different sized hands, can engage with the paddles in a comfortable position, thereby reducing the effects of prolonged or repeated use such as repetitive strain injury.

The paddle levers 11A, 11B, 11C, 11D each comprise a boss or protuberance 32. The projection 32 projects outwardly from an inner surface 22 of the member M. The inner surface 22 of the member M substantially opposes an outer surface 20 of the member M with which the user will engage.

The boss or protuberance 32 provides an engagement surface which is spaced from the inner surface 22 of the member M. This boss or protuberance 32 is configured to be aligned with a switch mechanism SC, see FIG. 9. The engagement surface is arranged to be disposed proximate the switch mechanism SC such that when the member M is pressed, the engagement surface contacts with the switch mechanism SC and activates the switch mechanism SC. One advantage of providing the boss or protuberance 32 is that the switch mechanism SC can be disposed in a recessed or flush position within the rear body panel 42 of the controller 10. There is no requirement for any part of the switch mechanism SC to project from the rear body panel 42 of the controller 10. In this way the switch mechanism SC is protected when the member M is detached from the controller 10. This allows a user to configure the controller with a desired number of paddles in the available positions provided on the controller 10. When the number of paddles levers 11A, 11B, 110, 11D employed is less than the number of available positions, those switch mechanisms SC in the vacant positions are protected by the rear body panel 42 of the controller 10. It also reduces the likelihood of a user accidentally or inadvertently activating a switch mechanism SC in a vacant position.

Each of the four paddle levers 11A, 11B, 11C, 11D can replicate the function of one of the four buttons 4 located on the front of the controller 10, and thereby allow a user to operate the functions of the relevant buttons for example by employing their middle fingers, without the need to remove either of their thumbs from the left or right thumb sticks 2, 3. In alternative embodiments, the paddle levers 11A, 11B, 11C, 11D may activate a new function not activated by the controls on the top of the controller 10.

The handles H1, H2 comprise an inner surface S, as shown in FIG. 5. The inner surface S is engaged by the middle, ring and little fingers of a user's hands. The ring and little fingers are increasingly important for grip of the controller when the middle fingers are employed actuating the paddles 11A, 11B, 11C, 11D. The inner surface S of each of the handles H1, H2 meets a region of the base of the controller 10 upon which the paddles 11A, 11B, 11C, 11D are mounted. The inner surface S is inclined at a steep angle with respect to this region of the controller 10. This angle is equal to or greater than 45 degrees; optionally it may be between about 50 degrees to about 60 degrees. The handles H1, H2 have a substantially flat top portion T. The flat top portion T meets the inner surface S to define a corner or edge; the corner or edge is sharp, that is to say has a small radius of curvature. In this way the handles H1, H2 provide an ergonomic shape for being grasped by the ring and little fingers of a user's hands.

Figure 2:
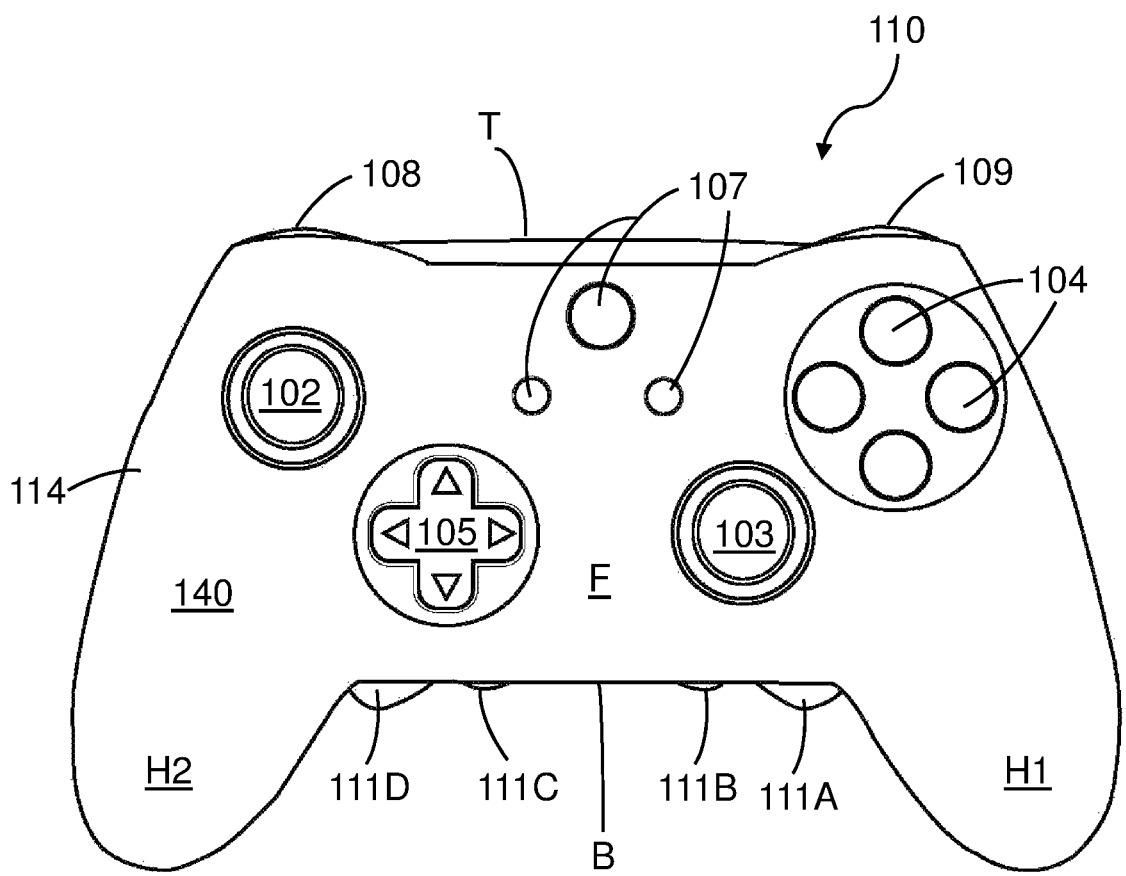
FIG. 2 is a plan view from above of the front of an input apparatus according to an alternative embodiment.

Referring now to FIG. 2, there is shown an alternative embodiment of the present disclosure. In the alternative illustrated embodiment like numerals have, where possible, been used to denote like parts, albeit with the addition of the prefix "100" to indicate that these features belong to a second embodiment. The alternative embodiment shares many common features with the first embodiment and therefore only the differences from the embodiment illustrated in FIGS. 1A, 1B and 3 to 13B will be described in any greater detail.

FIG. 2 illustrates a plan view from above of the front of an alternative input apparatus of controller 110 for a use with a computer. The controller 110 comprises first, left, and second, right, analogue control sticks, also known as thumb sticks 102, 103, which normally control movement and are intended to be operated by the user's left and right thumbs respectively, left and right thumb sticks are mounted to the front face of the controller 110, the left thumb stick is located in forward (or upper—nearer the top face of the controller 110) left region of the front face and right thumb stick is located in rearward (or lower—nearer the bottom face of the controller 110) right region of the front face. There are four buttons 104, located on a forward (or upper—nearer the top face of the controller 110) right portion of the front face of the controller 10, which normally control additional actions and are intended to be operated by the user's right thumb.

There is a direction pad 105 located on the rearward (or lower) left portion of the front face of the controller 110. The direction pad 5 is intended to be operated by the user's left thumb, typically either as an alternative to the left thumb stick 102 or to provide additional actions. A left shoulder button or bumper 8 and a right shoulder button or bumper 109 are located on the top face T of the controller 110. A left trigger 6 and a right trigger 107 are also located on the top face T of the controller 110, see FIG. 1B. The left and right triggers 106, 107 are typically operated by a user's index fingers. The left and right bumpers 108, 109 may also be operated by a user's index fingers. The left and right triggers 106, 107 may analogue in nature, or may comprise a plurality of discrete digital states, that is to say the input control is dependent upon the degree of depression or displacement of the trigger body.

The controller 110 may comprise one or more additional input buttons 107, the buttons 107 may take the form of digital or analogue button or may be in the form of a touch pad or touch screen. The controller comprises at least one additional control mounted to the back of the controller 110 substantially as described with reference to the embodiment of FIGS. 1A, 1B and 3 to 13B.

Figures 14A, 14B:
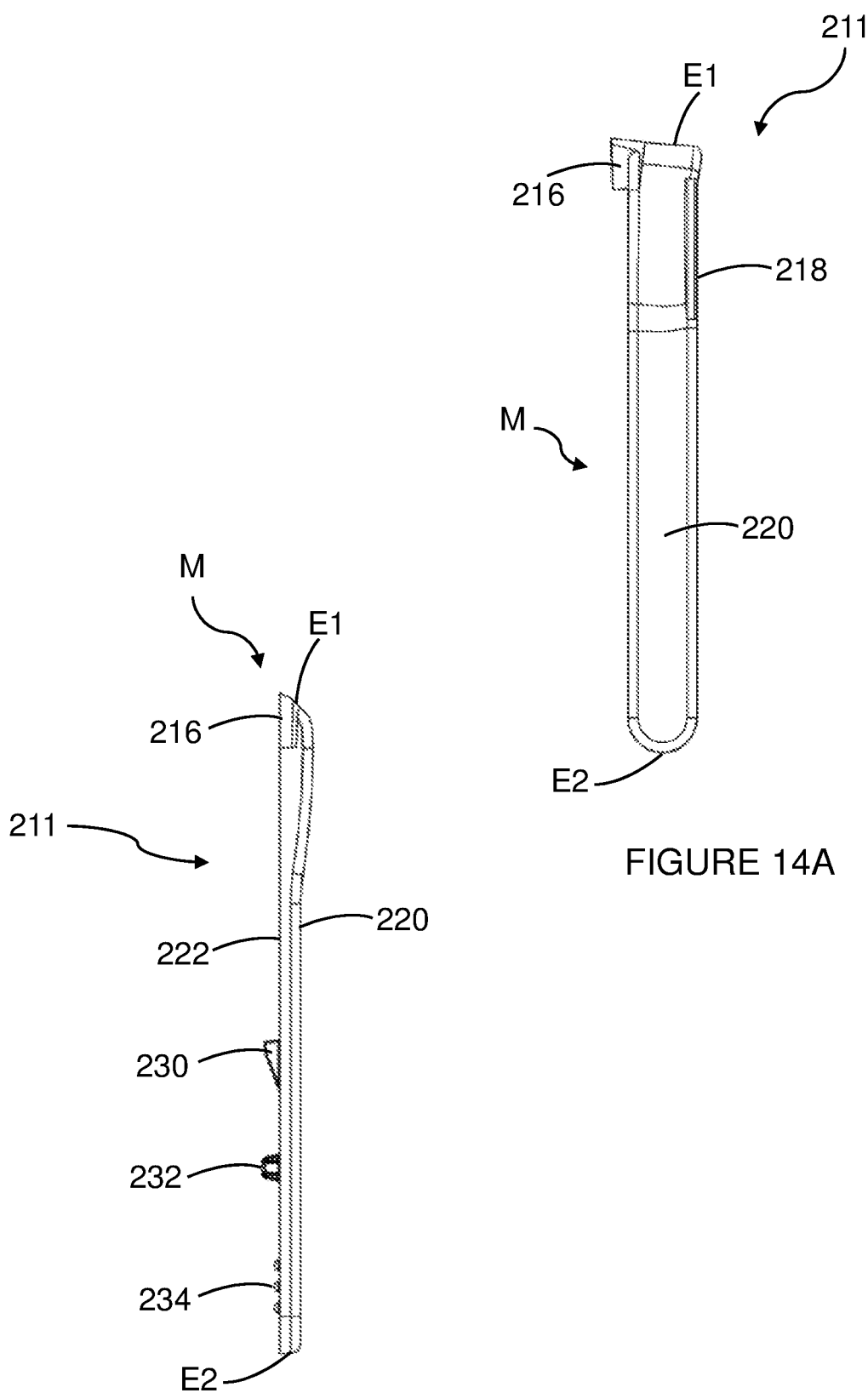
FIG. 14A is a plan view from below of an additional control component according to an alternative embodiment for attachment to the rear of the input apparatus of FIG. 1B.
FIG. 14B is a first side view of the component of FIG. 14A.

Referring now to FIGS. 14A, 14B, there is shown a further alternative embodiment of the present disclosure. In the further alternative illustrated embodiment like numerals have, where possible, been used to denote like parts, albeit with the addition of the prefix "200" to indicate that these features belong to a second embodiment. The alternative embodiment shares many common features with the first embodiment and therefore only the differences from the embodiment illustrated in FIGS. 1A, 1B and 3 to 13B will be described in any greater detail.

FIG. 14a illustrates a plan view of a paddle lever 211 according to a third embodiment. The paddle lever 211 comprises a boss or protuberance 232. The boss or protuberance 232 projects outwardly from an inner surface 222 of the paddle lever 211. The inner surface 222 of the paddle 211A substantially opposes an outer surface 220 of the paddle lever 211 which the user will engage. The paddle 211 according to the third embodiment may be employed with the rear body panel of the controller 10 of FIG. 1B.

The paddle levers 11A, 11B, 11C, 11D, 211 when pressed by the user engage with a respective one of the function switches $S_A$, $S_B$, $S_C$, $S_D$, as illustrated in FIG. 11A to activate the respective function which has been programmed to correspond to that switch.

The present disclosure provides an input apparatus for a computer or controller for a games console having at least one detachably mounted control member, the member comprising first parts of an attachment system for mating with second parts of an attachment system provided on a panel forming a portion of an outer case of the controller. The attachment system comprising a first complementary engagement mechanism, a second complementary engagement mechanism and a complementary locking mechanism. The first complementary engagement mechanism being operably engagable without engaging the second complementary engagement mechanism and or complementary locking mechanism. The second complementary engagement mechanism being operably engagable upon operably engaging the first complementary engagement mechanism. The second complementary engagement mechanism being operably engagable without engaging the complementary locking mechanism. The complementary locking mechanism being operably engagable upon operably engaging the first and second complementary engagement mechanisms.

The first complementary engagement mechanism comprises a first part and a second part, the first part may be one of a tongue and groove; the second part may be the other one of the tongue and groove. The first part and second part are arranged such that the first part is linearly translatable or moveable with respect the second part.

The second complementary engagement mechanism comprises a first part and a second part, the first part may be one of a tongue and groove; the second part may be the other one of the tongue and groove. The second complementary engagement mechanism is arranged such that first part is brought into engagement with the second part upon linear movement of the member and of the first part of the first complementary engagement mechanism with respect the second part of the first complementary engagement mechanism.

The complementary locking mechanism comprises a first part and a second part, the first part may be one of a ratchet and pawl; the second part may be the other one of the ratchet and pawl.

The complementary locking mechanism is configured such that the first and second parts of second complementary engagement mechanism may be moved into (and out of) an at least partially engaged position without bringing the first and second parts complementary locking mechanism into locking engagement.

An advantage of the attachment system is that separates the actions of insertion, engagement and locking of the paddle lever within the channel. Likewise the actions of unlocking, disengagement and withdrawal of the paddle from the channel are separated.

A further advantage is that the attachment system does not require the channel to surround the paddle lever on four sides. The channel can be formed as a trough. That is to say a portion of the rear body panel does not need to extend over an outer surface of the paddle lever. In this way at least a portion of the outer surface of paddle lever can be arranged to substantially flush with the outer surface of the rear body panel.

It can be appreciated that various changes may be made within the scope of the present invention. For example, the size and shape of the paddles may be adjusted to accommodate controllers of differing size or shape. Whilst the paddle levers may be mounted to a detachable cover panel such as but not limited to cover panel for a battery compartment. The detachable cover panel may be configured with channels and the respective elements of the attachment system for mating with complementary element of the attachment system provided by the paddle levers.

In some embodiments the microswitches may be replaced with a magnetic switch or sensor, for example a reed switch or hall sensor; the paddles may comprise a magnet arranged so as to activate the magnetic switch or sensor when the paddle is depressed by a user. It is envisaged that in such embodiments the magnetic switch or sensor is mounted inside the controller behind the back panel and that there will be no requirement to provide apertures through the back panel in order that the paddles can physically contact the microswitches. Further it is envisaged that the user may be provided with feedback to indicate that the switch has been activated. The feedback may be aural or haptic, for example, such as an audible click.

It is envisaged that the controllers may be coupled to a games console or computer by a wired connection or by a wireless connection device.

It is also envisaged that the controller may be constructed as a shell or caddy into which a handheld electronic device such as, but not limited to, a mobile telephone (smartphone) or tablet computer is inserted, the caddy comprising control actuators, thumb sticks and/or buttons (which are coupled to the electronic device either wirelessly or via physical or wired connection) for interaction with or control of the electronic device.

It will be recognised that as used herein, directional references such as "top", "bottom", "front", "back", "end", "side", "inner", "outer", "upper" and "lower" do not limit the respective features to such orientation, but merely serve to distinguish these features from one another.

The invention claimed is:

1. An input apparatus for a computer comprising an outer case having at least one detachably mounted control member, the member comprising first parts of an attachment system for mating with second parts of an attachment system provided on the outer case of the controller, the attachment system comprising a first complementary engagement mechanism, a second complementary engagement mechanism and a complementary locking mechanism, wherein the first complementary engagement mechanism is operably engagable without engaging the second complementary engagement mechanism and the complementary locking mechanism, the second complementary engagement mechanism is operably engagable upon engagement of the first complementary engagement mechanism, the second complementary engagement mechanism is operably engagable without engaging the complementary locking mechanism, the complementary locking mechanism is operably engagable upon engagement of the first and second complementary engagement mechanisms.

2. The input apparatus according to claim 1 wherein the first complementary engagement mechanism comprises a first part and a second part, the first part may be one of a tongue and groove; the second part may be the other one of the tongue and groove.

3. The input apparatus according to claim 1 wherein the first part and second part are arranged such that the first part is linearly translatable or moveable with respect the second part.

4. The input apparatus according to claim 1 wherein the second complementary engagement mechanism comprises a first part and a second part, the first part may be one of a tongue and groove; the second part may be the other one of the tongue and groove.

5. The input apparatus according to claim 1 wherein the second complementary engagement mechanism is arranged such that first part is brought into engagement with the second part upon linear movement of the member within a channel provided in the outer case.

6. The input apparatus according to claim 1 wherein the complementary locking mechanism comprises a first part and a second part, the first part may be one of a ratchet and pawl; the second part may be the other one of the ratchet and pawl.

7. The input apparatus according to claim 1 wherein the complementary locking mechanism is configured such that the first and second parts of the second complementary engagement mechanism may be moved into an at least partially engaged position without bringing the first and second parts complementary locking mechanism into locking engagement.

8. The input apparatus according to claim 1 wherein the member is mounted with a channel in the outer case.

9. The input apparatus according to claim 1 wherein the channel forms as a trough.

10. The input apparatus according to claim 1 wherein the member is mounted such that at least a portion of the outer surface of the member is substantially flush with a portion of an outer surface of the case.

11. The input apparatus according to claim 1 wherein the input apparatus is a hand held controller for a games console and further comprises:
  a plurality of controls located on a front face and top face of the controller;
  the controller being shaped to be held in both hands of a user such that the user's thumbs are positioned to operate controls located on the front of the controller and the user's index fingers are positioned to operate controls located on the top of the controller; wherein the controller further comprises at least one additional control located on a back of the controller in a position operable by the middle finger of a user, the at least one additional control comprising the detachably mounted control member at least partially disposed in a respective channel formed in a rear surface of the controller.

12. The input apparatus according to claim 11 wherein the channel forms a close fit to the elongate member so as to provide lateral support thereto.

13. The input apparatus according to claim 1 wherein a portion of the or each detachably mounted control member is in registry with a switch mechanism disposed within the controller, such that displacement of the member activates the switch mechanism.

14. The input apparatus according to claim 1 wherein the additional controls are paddle levers.

15. A control member for detachable mounting to input apparatus for a computer comprising an outer case one, the control member comprising first parts of an attachment system for mating with second parts of an attachment system provided on the outer case of the controller, the attachment system comprising a first complementary engagement mechanism, a second complementary engagement mechanism and a complementary locking mechanism, wherein the first complementary engagement mechanism is operably engagable without engaging the second complementary engagement mechanism and the complementary locking mechanism, the second complementary engagement mechanism is operably engagable upon engagement of the first complementary engagement mechanism, the second complementary engagement mechanism is operably engagable without engaging the complementary locking mechanism, the complementary locking mechanism is operably engagable upon engagement of the first and second complementary engagement mechanisms.

16. A control member for detachable mounting to input apparatus for a computer comprising an outer case one, the control member comprising first parts of an attachment system for mating with second parts of an attachment system provided on the outer case of the controller, the attachment system comprising a first complementary engagement mechanism, a second complementary engagement mechanism and a complementary locking mechanism, wherein a first part of the first complementary engagement mechanism comprises a first tongue for sliding engagement within a first groove and a first part of the second complementary engagement mechanism comprises a second tongue engaging within a second groove and a first part the complementary locking mechanism comprises a pawl for engaging with a ratchet.

17. The control member according to claim 16 wherein the first tongue comprises at least one end stop for limiting linear movement of the first tongue with respect to the first groove.

18. A hand held controller for a games console comprising:
- an outer case;
- a plurality of controls located on a front face and top face of the controller;
- the controller being shaped to be held in both hands of a user such that the user's thumbs are positioned to operate controls located on the front face of the controller and the user's index fingers are positioned to operate controls located on the top face of the controller; wherein
- the controller further comprises a channel a back face of the controller for receiving at least one additional control member located and arranged such that the at least one additional control member is in a position operable by the middle finger of a user, the channel comprising second parts of an attachment system for mating with first parts of an attachment system provided a control member, the attachment system comprising a first complementary engagement mechanism, a second complementary engagement mechanism and a complementary locking mechanism, wherein a second part of the first complementary engagement mechanism comprises a first groove for sliding engagement with a first tongue, the first groove defined at least in part by a projection from a side wall of the channel, the projection defining an undercut and wherein a second part of the second complementary engagement mechanism comprises a second groove for engaging within a second tongue, the second groove defined at least in part be a recess in an opposing side wall of the channel, and wherein a second part the complementary locking mechanism comprises a ratchet for engaging with a pawl the ratchet being provided on a rear face of the outer case.

19. A hand held controller according to claim 18 wherein the ratchet is collinear with the channel.

* * * * *